Patented Nov. 27, 1934

1,982,332

UNITED STATES PATENT OFFICE 1,982,332

AZODYESTUFFS

Carl Taube, Leverkusen-Wiesdorf, Germany, assignor to General Aniline Works, Inc., New York, N. Y., a corporation of Delaware No Drawing. Application March 17, 1932, Serial No. 599,591. In Germany March 25, 1931

10 Claims. (Cl. 260—72)

The present invention relates to azodyestuffs, more particularly it relates to dyestuffs which may be represented by the probable general formula:

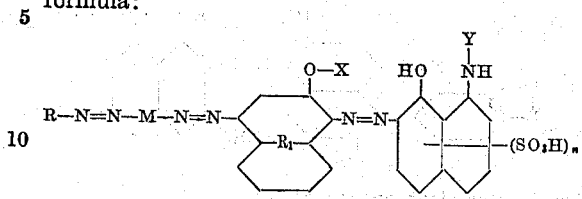

wherein "R" stands for the radical of a diazotization component of the benzene or naphthalene series, that means, for a benzene or naphthalene nucleus which may be substituted, for example, by a sulfonic acid group, a carboxylic acid group, a halogen atom, a hydroxy group, an alkoxy group, an alkyl group and a nitro group, "M" stands for the radical of a coupling component, containing a methylene group capable of coupling and containing a diazotizable amino group that means an amino group attached to an aromatic nucleus, "X" stands for alkyl or hydroxyalkyl in which the hydroxy group may be esterified by sulfuric acid, such as methyl, ethyl, propyl, isopropyl, for the group —CH$_2$—CH$_2$—OH, or for the group —CH$_2$—CH$_2$—O—SO$_3$H, "Y" stands for hydrogen, a benzene nucleus, or for an acyl group, such as an acetyl group or a benzoyl group, "$n$" stands for the numbers one or two, and wherein the nucleus "R$_1$" may be substituted by a sulfonic acid group.

As coupling components containing a methylene group capable of coupling and a diazotizable amino group, there may be mentioned by way of example 1 - (aminophenyl) - 3-methyl-5-pyrazolone, 1-(aminophenyl)-5-pyrazolone-3-carboxylic acid, Bz-aminomethylketol of the formula:

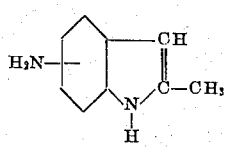

Bz-aminosulfazone of the formula:

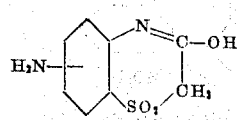

Bz-amino-2.4-dihydroxyquinoline of the formula:

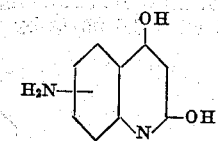

Bz-amino-acetoacetic acid arylamides, such as amino-acetoacetic acid anilide, amino-acetoacetic acid chloroanilide, amino-acetoacetic acid toluidide, amino-acetoacetic acid anisidide or other derivatives of β-ketoaldehydes, for instance, Bz-amino-1.3-diketohydroindene of the formula:

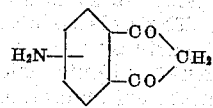

The new products are obtainable by coupling a diazotized amine of the benzene or naphthalene series with a compound containing a methylene group capable of coupling and a diazotizable amino group, further diazotizing the product thus obtained, combining with an 1-amino-2-naphtholether or a derivative thereof, again diazotizing and finally coupling in pyridine solution with a 1-amino-8-naphthol-sulfonic acid or an N-acyl derivative thereof.

My new dyestuffs are in the form of their alkali metal salts generally dark powders. They are soluble in water and dye the cellulosic fibre generally green shades of good fastness properties.

The invention is illustrated by the following examples, without being limited thereto:

*Example 1.*—10 parts by weight of 2.5-dichloroaniline-4-sulfonic acid are diazotized in the customary manner with 2.48 parts by weight of sodium nitrite and hydrochloric acid, and after neutralizing with sodium acetate, the diazo compound is coupled with 8.3 parts by weight of 1-(m-aminophenyl)-3-methyl-5-pyrazolone. The yellow dyestuff is isolated, dissolved in dilute sodium carbonate solution and diazotized with 2.5 parts by weight of sodium nitrite and hydrochloric acid. The diazonium salt is coupled after filtration with 10 parts by weight of finely divided 1-amino-2-naphtholethylether-6-sulfonic acid, the brown product is dissolved in dilute caustic soda (giving a yellowish red coloration) and diazotized with excess sodium nitrite and hydrochloric acid, the diazonium salt is isolated and coupled with 15 parts by weight of 1-acetylamino-8-naphthol-3.6-disulfonic acid in the presence of pyridine. The polyazodyestuff having in the free state the following formula:

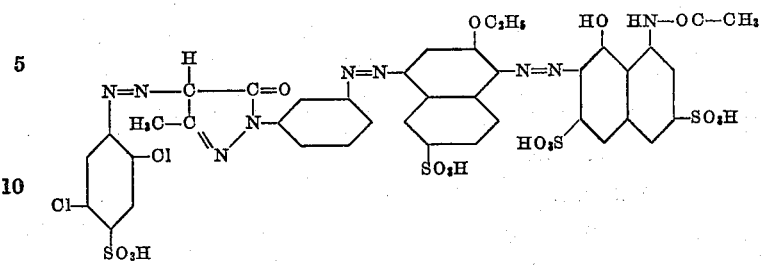

is isolated and dried in the customary manner. It is a black powder, readily soluble in water with a green coloration; cotton is dyed by the customary dyeing processes a clear bluish green shade.

*Example 2.*—5.05 parts by weight of o-sulfanilic acid are diazotized in the customary manner with 2 parts by weight of sodium nitrite and hydrochloric acid, and, after neutralizing with sodium acetate, coupled with 6.6 parts by weight of the hydrochloride of p-amino-acetoacetic acid anilide. The yellow dyestuff is isolated, dissolved in dilute sodium carbonate solution and diazotized with 2 parts by weight of sodium nitrite and hydrochloric acid. The isolated diazonium salt is coupled with 8.5 parts by weight of 1-amino-2-naphtholethylether-6-sulfonic acid, further diazotized in the customary manner and finally coupled with 14 parts by weight of 1-acetylamino-8-naphthol-3.6-disulfonic acid in the presence of pyridine. The isolated dyestuff having in the free state the following formula:

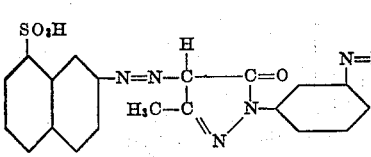

dyes cotton a yellowish green shade.

*Example 3.*—10 parts by weight of 2-naphthylamine-8-sulfonic acid are diazotized in the customary manner with 2.82 parts by weight of sodium nitrite and hydrochloric acid, and, after neutralization with sodium acetate, are coupled with 9.4 parts by weight of 1-(m-aminophenyl)-3-methyl-5-pyrazolone. The yellow dyestuff is filtered, dissolved in dilute caustic soda, diazotized with 2.8 parts by weight of sodium nitrite and hydrochloric acid, and, after neutralization with sodium acetate, coupled with 12 parts by weight of 1-amino-2-naphtholethylether-6-sulfonic acid. The product is filtered, dissolved in dilute caustic soda and diazotized with 3.2 parts by weight of sodium nitrite and hydrochloric acid. The diazonium salt is isolated and coupled with 18 parts by weight of 1-acetylamino-8-naphthol-3.6-disulfonic acid in the presence of pyridine. The dyestuff having in the free state the following formula:

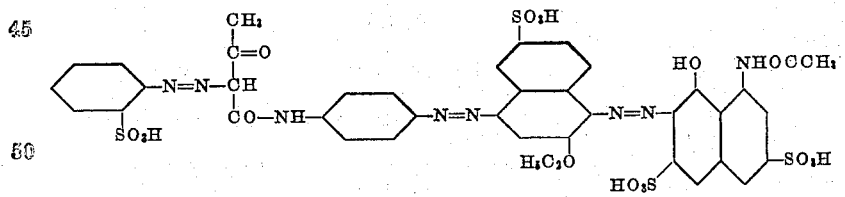

dyes cotton deep green shades.

*Example 4.*—10 parts by weight of 4-chloro-2-sulfanilic acid are diazotized in the customary manner with 3.32 parts by weight of sodium nitrite and hydrochloric acid, and, after neutralization with sodium acetate, are coupled with 11.1 parts by weight of 1-(m-aminophenyl)-3-methyl-5-pyrazolone. The dyestuff is isolated, diazotized with 3.3 parts by weight of sodium nitrite and hydrochloric acid, and, after neutralization with sodium acetate, coupled with 14 parts by weight of 1-amino-2-naphtholethylether-6-sulfonic acid. The product is isolated, dissolved in dilute caustic soda and diazotized with 4.5 parts by weight of sodium nitrite and hydrochloric acid. The diazonium salt is coupled after filtration in the presence of pyridine with 25 parts by weight of 1-(2',4'-dichlorobenzoyl)-amino-8-naphthol-4.6-disulfonic acid. The dyestuff having in the free state the following formula:

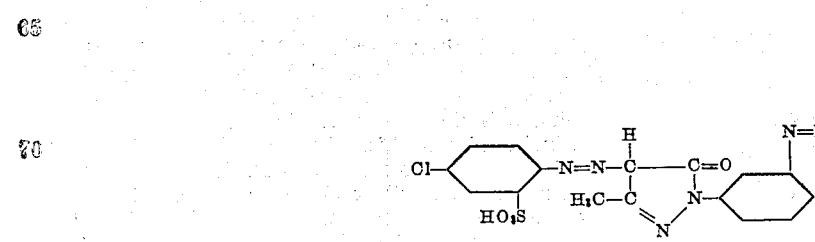

dyes cotton a clear green shade.

*Example 5.*—10 parts by weight of 2-nitro-4-sulfanilic acid are diazotized in the customary manner with 2.7 parts by weight of sodium nitrite and hydrochlorid acid, and, after neutralization with sodium acetate, coupled with 9 parts by weight of 1-(m-amino-phenyl)-3-methyl-5-pyrazolone. The dyestuff is isolated, dissolved in dilute caustic soda and diazotized with 2.7 parts by weight of sodium nitrite and hydrochloric acid. The diazonium salt is isolated, and, after neutralizing with sodium acetate, is coupled with 11 parts by weight of finely divided 1-amino-2-naphtholethylether-6-sulfonic acid. The product thus obtainable is isolated, dissolved in dilute caustic soda, diazotized with 3.5 parts by weight of sodium nitrite and hydrochloric acid, the diazonium salt is isolated and coupled in the presence of pyridine with 20 parts by weight of 1-acetamino-8-naphthol-3.6-disulfonic acid. The dyestuff having in the free state the following formula:

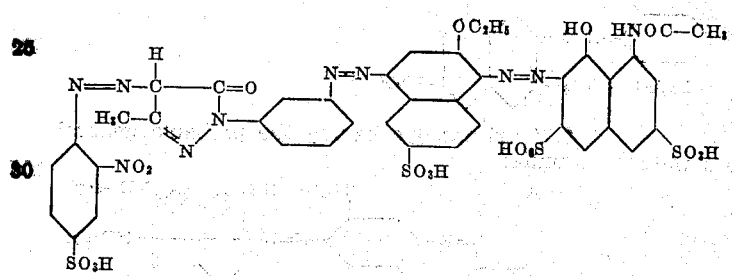

dyes cotton clear yellowish green shades.

Similar combinations are produced when instead of the components specified in the examples there is used as the first component p-anisidine-o-sulfonic acid ($OCH_3=1$), aniline-2.5-disulfonic acid, 4-toluidine-2-sulfanilide, 4-toluidine-3-sulfonic acid, m-xylidine-o-sulfonic acid or 4-acetamino-2-sulfanilic acid, as the second component 1-(p-aminophenyl)-3-methyl-5-pyrazolone, m-aminoacetoacetic anilide or 1-(m-amino-p-chloro-phenyl)-3-methyl-5-pyrazolone, as the third component another 1-amino-2-naphtholether compound such as the unsulfonated 1-amino-2-naphtholether, 1-amino-2-naphtholglycolether, and the sulfuric acid ester thereof or the like, and as the last component 1-benzoylaminonaphthol-3.6-disulfonic acid, 1-acetylamino-8-naphthol-4,6-disulfonic acid or the like.

I claim:

1. Azodyestuffs of the probable general formula:

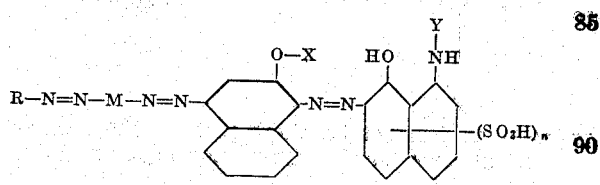

wherein "R" stands for the radical of a diazotization component of the benzene or naphthalene series, "M" stands for the radical of a coupling component containing a methylene group capable of coupling and a diazotizable amino group, "X" stands for alkyl or hydroxyalkyl in which the hydroxy group may be esterified by sulfuric acid, "Y" stands for hydrogen or an acyl group, "$n$" stands for the numbers one or two, and wherein the nucleus "$R_1$" may be substituted by a sulfonic acid group, being in form of their alkali metal salts generally water soluble dark powders, dyeing the cellulosic fibre generally green shades of good fastness properties.

2. Azodyestuffs of the probable general formula:

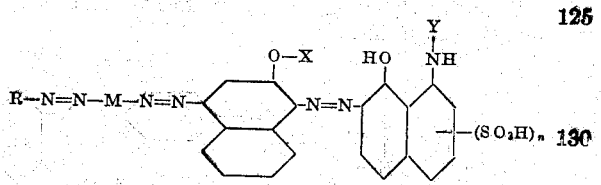

wherein "R" stands for the radical of a diazotization component of the benzene or naphthalene series, "M" stands for the radical of an (amino-phenyl)-pyrazolone or for the radical of an amino-aceto-acetic acid-arylamide, "X" stands for alkyl or hydroxyalkyl in which the hydroxy group may be esterified by sulfuric acid, "Y" stands for hydrogen or an acyl group, "$n$" stands for the numbers one or two, and wherein the nucleus "$R_1$" may be substituted by a sulfonic acid group, being in form of their alkali metal salts generally water soluble dark powders, dyeing the cellulosic fibre generally green shades of good fastness properties.

3. Azodyestuffs of the probable general formula wherein "R" stands for a benzene or naphthalene nucleus which may be substituted by substituents selected from the group consisting of the sulfonic acid group, the carboxylic acid group, a halogen atom, the hydroxy group, an alkoxy group, an alkyl group and the nitro group, "M" stands for the radical of an (amino-phenyl)-pyrazolone or for the radical of an amino-aceto-acetic acid-arylamide, "X" stands for alkyl or hydroxyalkyl in which the hydroxy group may be esterified by sulfuric acid, "Y" stands for hydrogen or an acyl group, "$n$" stands for the numbers one or two, and wherein the nucleus "$R_1$" may be substituted by a sulfonic acid group, being in form of their alkali metal salts generally water soluble dark powders, dyeing the cellulosic fibre generally green shades of good fastness properties.

4. The azodyestuff having in its free state the following formula:

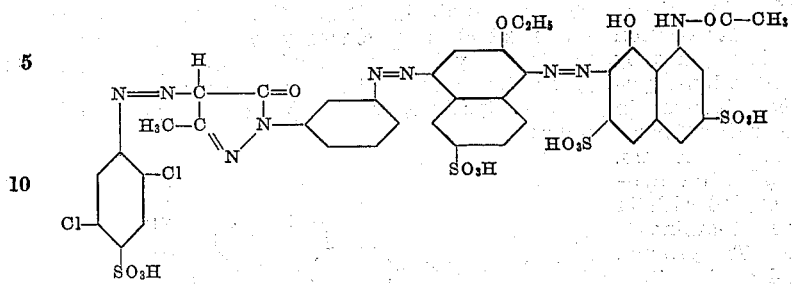

being in form of its alkali metal salts a water soluble black powder dyeing cotton clear bluish green shade.

5. The azodyestuff having in its free state the following formula:

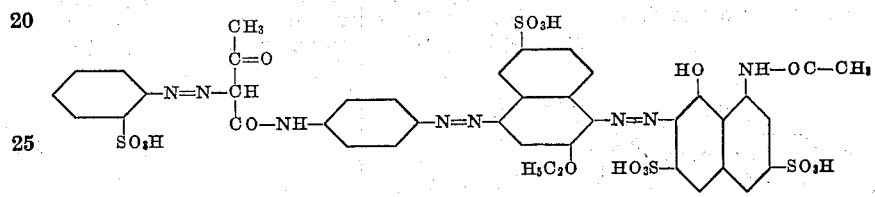

being in form of its alkali metal salts a water-soluble dark powder, dyeing cotton yellowish green shades.

6. The azodyestuff having in its free state the following formula:

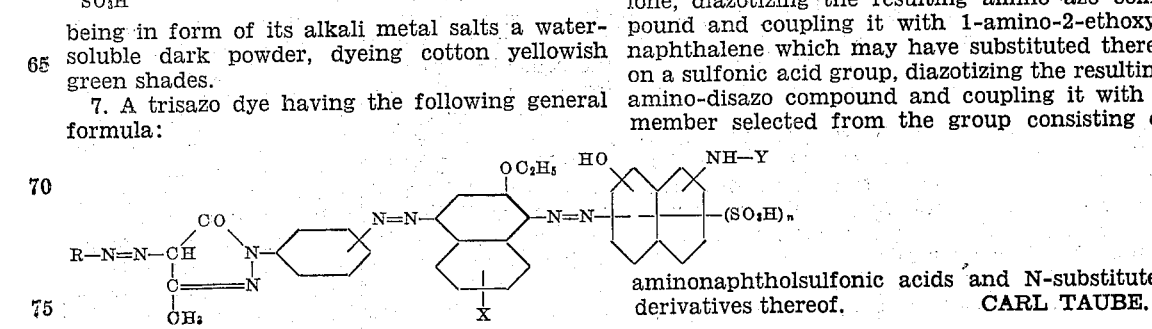

being in form of its alkali metal salts a water-soluble dark powder, dyeing cotton yellowish green shades.

7. A trisazo dye having the following general formula:

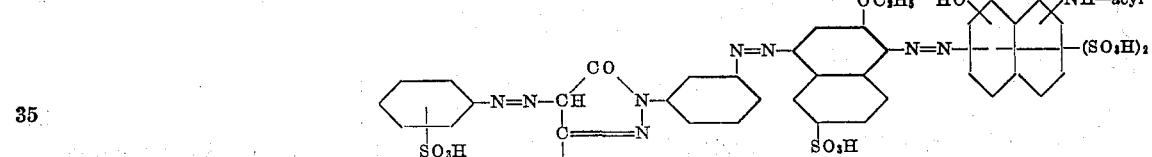

wherein R is the radical of a diazo component of the benzene or naphthalene series which may have substituted thereon sulfonic acid and halogen groups, X stands for hydrogen or a sulfonic acid group, Y stands for hydrogen, a benzene nucleus or an acyl group and $n$ stands for the numbers 1 or 2.

8. A trisazo dye having the probable general formula:

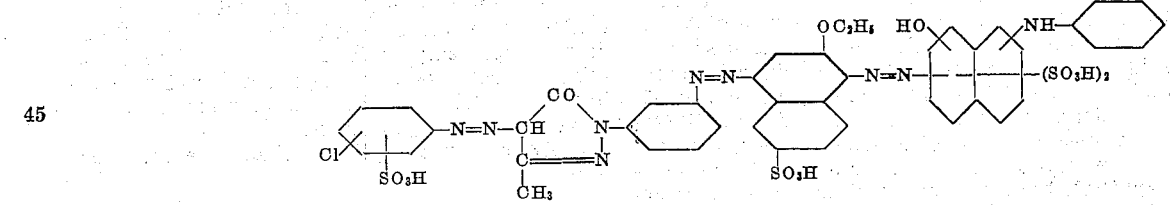

9. A trisazo dye having the probable general formula:

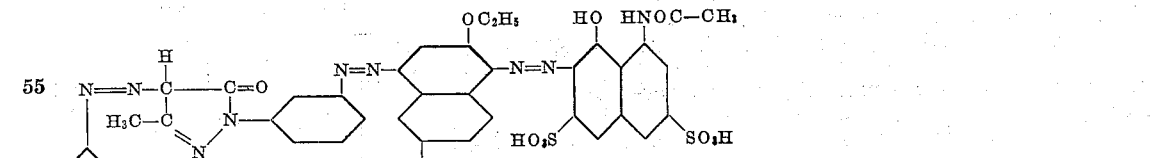

10. A process for producing trisazo dyes which comprises coupling a diazotized amine of the benzene or naphthalene series, which may be further substituted by sulphonic acid and chlorine groups, with 1-(m-amino-phenyl)-3-methyl-5-pyrazolone, diazotizing the resulting amino azo compound and coupling it with 1-amino-2-ethoxy-naphthalene which may have substituted thereon a sulfonic acid group, diazotizing the resulting amino-disazo compound and coupling it with a member selected from the group consisting of aminonaphtholsulfonic acids and N-substituted derivatives thereof.

CARL TAUBE.